(12) United States Patent
Kim et al.

(10) Patent No.: US 10,106,420 B2
(45) Date of Patent: Oct. 23, 2018

(54) METHOD FOR MANUFACTURING GRAPHENE FIBER

(71) Applicant: IUCF-HYU (INDUSTRY-UNIVERSITY COOPERATION FOUNDATION HANYANG UNIVERSITY), Seoul (KR)

(72) Inventors: Seon Jeong Kim, Seoul (KR); Min Kyoon Shin, Seoul (KR); Shi Hyeong Kim, Seoul (KR)

(73) Assignee: IUCF-HYU (INDUSTRY-UNIVERSITY COOPERATION FOUNDATION HANYANG UNIVERSITY), Seoul (KR)

( * ) Notice: Subject to any disclaimer, the term of this patent is extended or adjusted under 35 U.S.C. 154(b) by 225 days.

(21) Appl. No.: 15/204,580

(22) Filed: Jul. 7, 2016

(65) Prior Publication Data
US 2016/0318767 A1    Nov. 3, 2016

Related U.S. Application Data

(62) Division of application No. 14/004,829, filed as application No. PCT/KR2012/001718 on Mar. 9, 2012.

(30) Foreign Application Priority Data

Mar. 15, 2011    (KR) .................. 10-2011-0022832

(51) Int. Cl.
| | | |
|---|---|---|
| D01D 10/02 | (2006.01) | |
| D01D 10/06 | (2006.01) | |
| D01F 11/06 | (2006.01) | |
| D02J 13/00 | (2006.01) | |
| D06M 11/11 | (2006.01) | |
| D06M 11/50 | (2006.01) | |
| C01B 31/04 | (2006.01) | |
| D01D 1/02 | (2006.01) | |
| D01D 5/06 | (2006.01) | |
| D01F 1/09 | (2006.01) | |
| D01F 6/14 | (2006.01) | |
| D01F 6/16 | (2006.01) | |
| D01F 9/12 | (2006.01) | |
| D01D 5/247 | (2006.01) | |
| D01D 1/06 | (2006.01) | |
| C01B 32/194 | (2017.01) | |
| B82Y 30/00 | (2011.01) | |
| B82Y 40/00 | (2011.01) | |

(52) U.S. Cl.
CPC ........ *C01B 31/0484* (2013.01); *C01B 32/194* (2017.08); *D01D 1/02* (2013.01); *D01D 1/06* (2013.01); *D01D 5/06* (2013.01); *D01D 5/247* (2013.01); *D01F 1/09* (2013.01); *D01F 6/14* (2013.01); *D01F 6/16* (2013.01); *D01F 9/12* (2013.01); *B82Y 30/00* (2013.01); *B82Y 40/00* (2013.01); *Y10T 428/2918* (2015.01)

(58) Field of Classification Search
CPC ............ D01D 1/02; D01D 5/06; D01D 5/247; D01D 10/02; D01D 10/06; D01F 1/02; D01F 1/10; D01F 6/14; D01F 6/16; D01F 9/12; D01F 11/06; D02J 13/00; D06M 11/11; D06M 11/50
USPC ........ 264/178 F, 184, 185, 203, 211, 211.14, 264/211.15, 211.16, 211.17, 235
See application file for complete search history.

(56) References Cited

U.S. PATENT DOCUMENTS

| | | |
|---|---|---|
| 4,915,925 A | 4/1990 | Chung |
| 2007/0092432 A1 | 4/2007 | Prud'Homme et al. |
| 2010/0036023 A1 | 2/2010 | Weng et al. |
| 2011/0157772 A1 | 6/2011 | Zhamu et al. |
| 2012/0026643 A1 | 2/2012 | Yu et al. |

OTHER PUBLICATIONS

Dan Li, et al; "Processable aqueous dispersions of graphene nanosheets", Nature Nanotechnolooy, vol. 3, Feb. 2008; pp. 101-105.
Adila Rani, et al; "Electrical Conductivity of Chemically Reduced Graphene Powders under Compression", Carbon Letters, vol. 11, No. 2, Jun. 2010, pp. 90-95.
USPTO RR dated Sep. 4, 2015 in connection with U.S. Appl. No. 14/004,829.
USPTO NFOA dated Dec. 14, 2015 in connection with U.S. Appl. No. 14/004,829.
USPTO FOA dated Apr. 8, 2016 in connection with U.S. Appl. No. 14/004,829.

*Primary Examiner* — Leo B Tentoni
(74) *Attorney, Agent, or Firm* — Ladas & Parry LLP

(57) ABSTRACT

The present invention relates to a method for manufacturing a graphene fiber and a graphene fiber manufactured thereby, comprising the following steps: a) preparing a dispersion liquid by dispersing graphene with a surfactant in a solvent; b) preparing a composite fiber by mixing the dispersion liquid with a polymer solution, wet spinning and drying same; and c) removing polymers by heat-treating or treating the composite fiber with strong acid. The graphene fiber manufactured by the method has superior electric and mechanical properties, is flexible, and can be utilized as a storage medium for energy, hydrogen, etc. due to porosity from having a wrinkled structure.

9 Claims, 4 Drawing Sheets

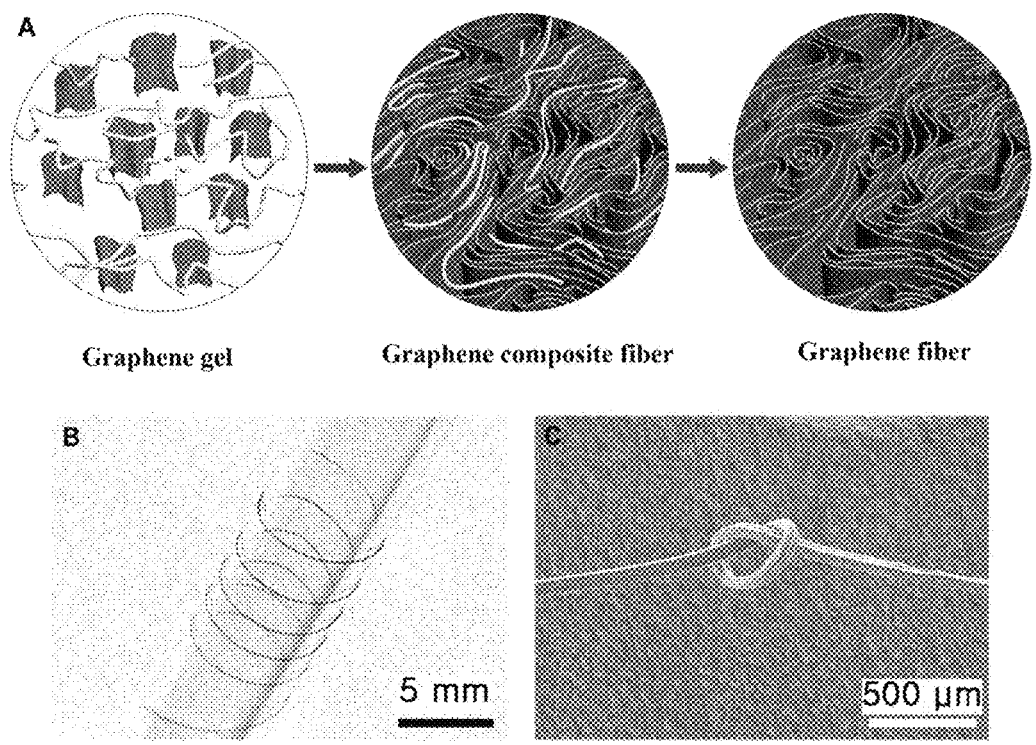
[Figure 1]

[Figure 2]
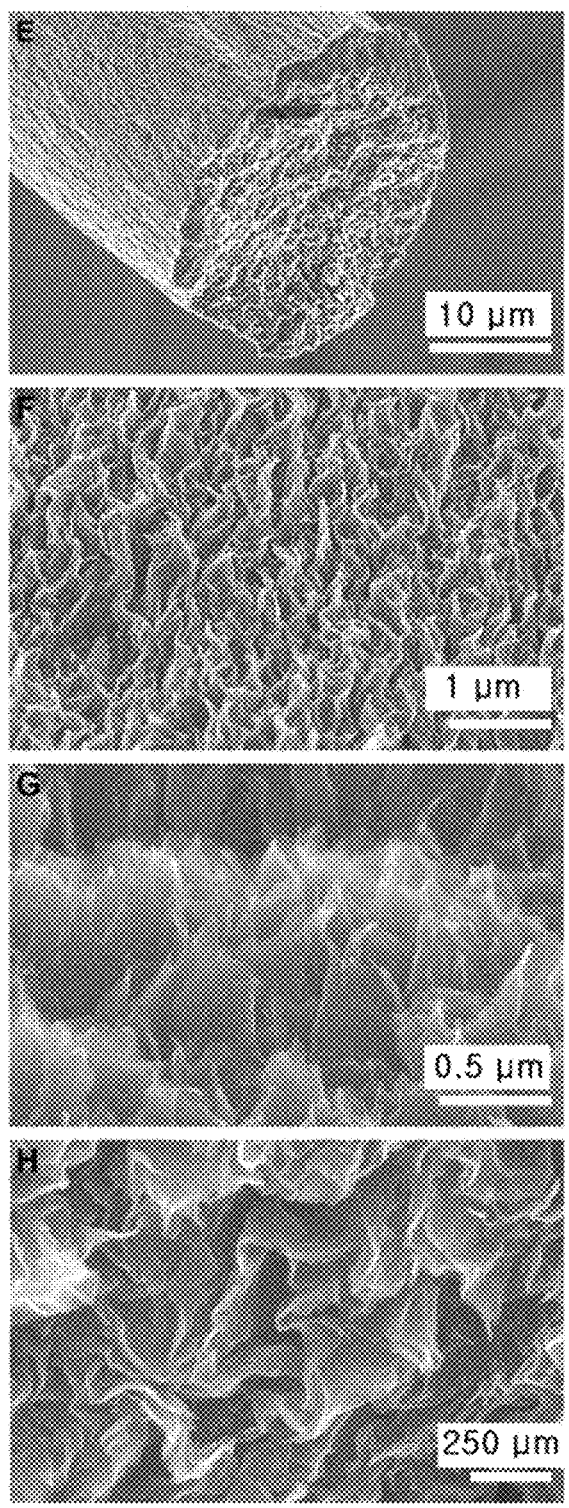

[Figure 3]
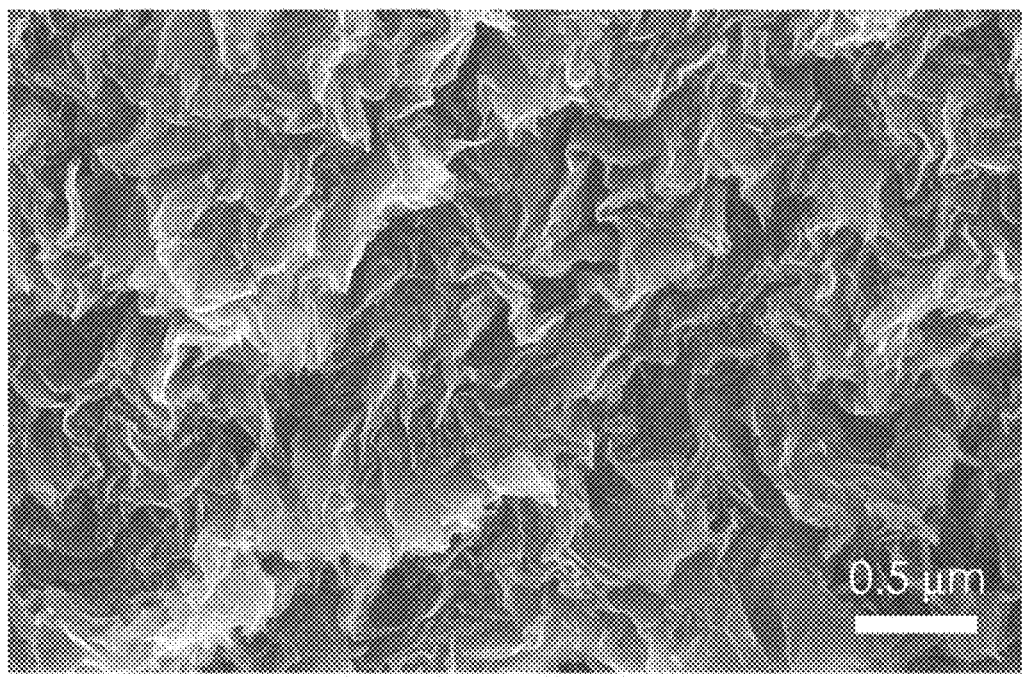

[Figure 4]
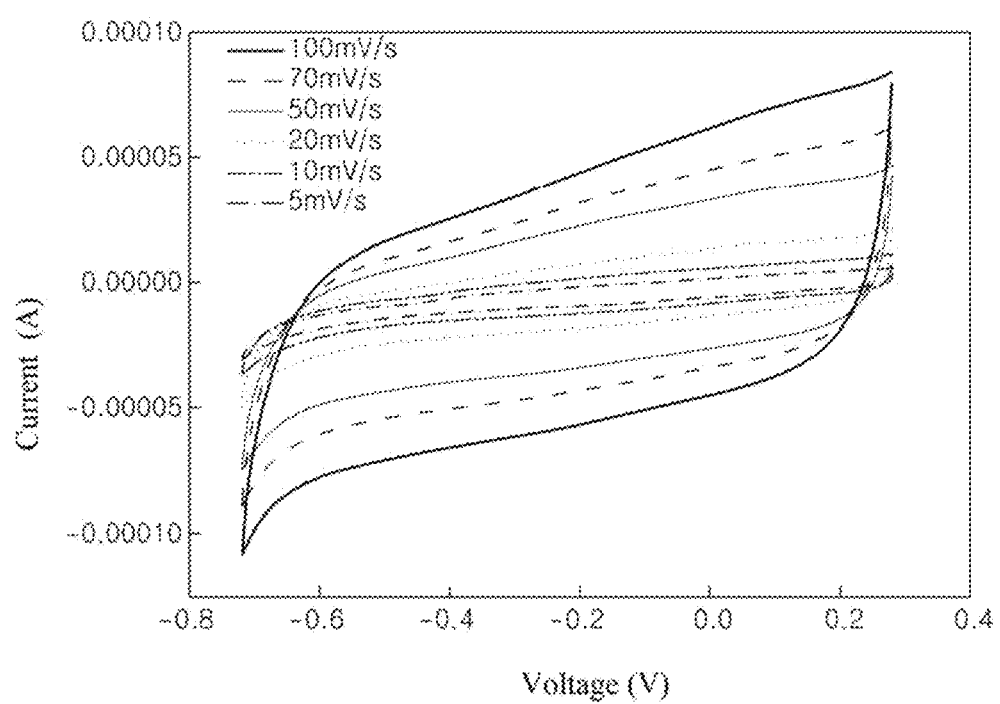

METHOD FOR MANUFACTURING GRAPHENE FIBER

The present application is a division of U.S. patent application Ser. No. 14/004,829 filed on Sep. 12, 2013, now abandoned which is the U.S. National Stage Application of International No. PCT/KR2012/001718 filed on Mar. 9, 2012.

TECHNICAL FIELD

The present invention relates to a method for producing a graphene fiber and a graphene fiber produced by the method. More specifically, the present invention relates to a porous graphene fiber including graphene whose wrinkled structure is maintained to achieve excellent mechanical and electrochemical properties, and a method for producing the graphene fiber.

BACKGROUND ART

Graphene is a two-dimensional nanostructure of covalently bonded carbon atoms and exhibits outstanding mechanical, electrical, and thermal properties. Graphene flakes consist of single or several graphene sheets exfoliated from graphite. Graphene flakes have been reconstituted into bulky structures that have a modulus of elasticity exceeding that of flexible graphite while possessing high strength.

A major challenge for graphene structures with high strength and toughness is to maintain the inherent active surface of graphene by preventing restacking of graphene tending to form close-packed layer structures. Single-layer graphene or a graphene flake has a wrinkled structure due to high area-to-thickness ratio thereof, but a graphene paper or composite including a large amount of graphene usually has a dense layer structure similar to graphite. The dense layered structure of graphene is an obstacle in achieving maximum mechanical properties owing to the short length of graphene that reduces the van der Waals force and tensile strength between graphene layers (by 1% or less).

There are some reports on complexes including less than 1% of graphene whose wrinkled structure is maintained. However, there is no report regarding the development of composite fibers including graphene alone or at a considerable concentration while maintaining the wrinkled structure of graphene.

The dense layered structure of graphene composites limits application thereof to energy and hydrogen storage media. For these reasons, there is a need to improve the porosity, mechanical properties and electrochemical properties of graphene structures.

DISCLOSURE

Technical Problem

It is an object of the present invention to provide a porous graphene fiber that is flexible and has excellent mechanical and electrochemical properties, and a method for producing the graphene fiber.

Technical Solution

According to an aspect of the present invention, there is provided a method for producing a graphene fiber, including a) dispersing graphene and a surfactant in a solvent to prepare a dispersion, b) incorporating the dispersion into a polymer solution, wet spinning the resulting solution, followed by drying to produce a composite fiber, and c) annealing the composite fiber or treating the composite fiber with a strong acid to remove the polymer.

In one embodiment of the present invention, the graphene is preferably chemically reduced graphene or graphene oxide, more preferably reduced graphene with acid functional groups.

In one embodiment of the present invention, the chemically reduced graphene may be prepared by reducing an aqueous dispersion of graphene with hydrazine at 90 to 100° C. for 1 to 24 hours.

In one embodiment of the present invention, the annealing is preferably performed at a temperature of 300 to 1000° C.

In one embodiment of the present invention, the strong acid used to remove the polymer may be hydrochloric acid, sulfuric acid, a piranha solution consisting of a mixture of sulfuric acid and hydrogen peroxide, or a superacid consisting of a mixture of sulfuric acid and oleum. The strong acid is preferably 30 to 40 wt % hydrochloric acid.

In one embodiment of the present invention, the surfactant used to disperse the graphene is preferably selected from sodium dodecyl benzene sulfonate (SDBS), sodium dodecyl sulfonate (SDS), Triton X-100, and cetyltrimethylammonium bromide (CTAB). The surfactant is more preferably sodium dodecyl benzene sulfonate (SDBS).

The polymer used in the method of the present invention is preferably selected from polyvinyl alcohol (PVA), poly (methyl methacrylate) (PMMA), and a mixture thereof.

In one embodiment of the present invention, the contents of the graphene and the polymer in the graphene composite fiber are from 20 to 90% by weight and from 10 to 80% by weight, respectively. Within these ranges, the wrinkled structure of the graphene can be maintained.

The present invention also provides a porous graphene fiber including graphene whose wrinkled structure is maintained even when a polymer is removed from a graphene composite fiber. The porous graphene fiber of the present invention has an electrical conductivity of 10 to 100 S/cm, an electrochemical capacitance of 100 to 300 F/g, and a porosity of 1000 to 2000 $m^2/g$. The length of the graphene is preferably from 100 to 1000 nm, the diameter of the graphene composite fiber is typically from 30 to 100 μm, which may be controlled by the diameter of a syringe tip used during wet spinning, and the diameter of the porous graphene fiber after the polymer removal is typically from 15 to 50 μm.

The porous graphene fiber of the present invention may be formed into knot and spring structures due to flexibility thereof, and several strands thereof may also be woven into a fabric.

The porous graphene fiber of the present invention can be utilized in a supercapacitor or an energy or hydrogen storage medium due to excellent electrical and mechanical properties and high porosity thereof.

Advantageous Effects

The graphene fiber of the present invention, which includes graphene whose wrinkled structure is maintained, exhibits far superior mechanical and electrochemical properties to conventional graphene papers, graphene composite films, and flexible graphite.

For effective current collection, graphene electrodes for supercapacitors, fuel cells, and batteries as conventional energy storage media have been used in combination with highly electrically conductive metals. In contrast, high electrical conductivity of the porous graphene fiber according to the present invention eliminates the need for a separate metal electrode.

In addition, the graphene fiber of the present invention can be formed into knot or spring structures due to flexibility thereof and can also be woven into a fabric. Therefore, the graphene fiber of the present invention is applicable to a wide variety of fields. The wrinkled structure of graphene makes the graphene fiber of the present invention porous. This enables utilization of the graphene fiber of the present invention in energy and hydrogen storage media, etc.

Furthermore, the porous graphene fiber of the present invention can be mass-produced in a simple and economical manner and its length can be extended to tens of meters in a continuous process. Therefore, the porous graphene fiber of the present invention is ideally suited to industrial applications.

DESCRIPTION OF DRAWINGS

FIG. 1 is a conceptual diagram showing the procedure for producing a fiber composed of graphene flakes having directivity and wrinkles according to the present invention.

FIG. 2 shows SEM images of the surface and cross-sectional morphologies of a graphene fiber having a wrinkled structure according to the present invention.

FIG. 3 is a SEM image showing the cross section of a graphene fiber from which PVA was removed by annealing a graphene/PVA fiber at 600° C.

FIG. 4 shows cyclic voltammograms of a graphene fiber of the present invention at different scan rates.

MODE FOR INVENTION

The present invention will now be described in more detail with reference to exemplary embodiments thereof.

FIG. 1 is a conceptual diagram showing the procedure for producing a fiber composed of graphene flakes having directivity and wrinkles according to the present invention. According to the method of the present invention, graphene can be prevented from restacking in the individual steps of producing a fiber from a graphene solution in order to maintain a wrinkled structure.

First, chemically converted graphene flakes (RCCGFs) with functional groups such as COOH groups are dispersed in dimethylformamide (DMF). An electrostatic repulsive force induced by the functional groups allows stable maintenance of the dispersion state of the graphene for at least 3 months without serious aggregation of the graphene. In this case, the following relationship is satisfied:

$$F_R \geq F_G + F_{V.D.W.}$$

where $F_R$, $F_G$, and $F_{V.D.W.}$ represent the electrostatic repulsive force, the force of gravity, and the van der Waals force between the graphene flakes, respectively. The relations of forces in the graphene solution during the overall fiber production procedure are as follows.

1. The chemically converted graphene is well dispersed in DMF under the following condition:

Electrostatic repulsive force≥(van der Waals force)+ (force of gravity)

2. For a wet spinning solution, when DMF is exchanged with distilled water by centrifugation:

Electrostatic repulsive force≥(van der Waals force)+ (force of gravity by graphene)+(centrifugal force)

3. The step of sufficiently dispersing graphene in distilled water with the help of SDBS as a surfactant:

Electrostatic repulsive forces (graphene+SDBS)+ dispersion force by sonication≥(van der Waals force)+(force of gravity by graphene)

This condition may be varied with increasing time when a large amount of graphene is loaded, and as a result, the graphene may aggregate.

4. During wet spinning, PVA chains replace SDBS and the wrinkled graphene surrounded by the PVA chains is aligned in a graphene fiber by a shear force induced by a shear flow.

5. After wet spinning, a graphene gel in the solution undergoes a hydrostatic force. The hydrostatic force does not greatly affect restacking of the graphene.

6. Drying

Gravimetric force is applied during drying, but stacking occurs only in the axial direction, thus maintaining the wrinkled structure of the graphene.

Since hydrophobic interaction between graphene flakes is necessary for fiber production during wet spinning, the degree of reduction of the chemically converted graphene flakes is of importance. In other words, hydrophilicity of graphene flakes or somewhat less reduced graphene flakes impedes sufficient hydrophobic interaction between the graphene flakes, making the formation of a gel-fiber difficult.

Accordingly, appropriate reduction of graphene is essential for the preparation of a stable dispersion and the production of an assembly by wet spinning. The atomic fractions of carbon and oxygen in the reduced graphene flakes (RCCGF) determined from XPS data are 88.05% and 9.75%, respectively.

According to the method of the present invention, a graphene fiber is produced by the following procedure. First, a graphene/DMF solution is prepared. The DMF is exchanged with distilled water by sonication and centrifugation, and the graphene is well dispersed in distilled water with the help of a surfactant to prepare a graphene solution. The graphene solution is incorporated into a coagulation bath containing polyvinyl alcohol (PVA). The graphene solution incorporated into the polymer is changed to a graphene gel-fiber by an assembly process through hydrophobic interaction between the graphene flakes surrounded by the PVA chains replacing the surfactant bonded to the graphene flakes. The graphene gel-fiber is washed with distilled water to remove excess PVA.

Although hydrostatic forces are applied to the graphene gel-fiber in the PVA solution and distilled water, the wrinkled structure of the graphene flakes can be maintained because the magnitudes of the hydrostatic forces in the x, y, and z directions are equal. Then, the graphene gel-fiber is suspended vertically and dried in air. As a result, a graphene-based composite fiber having a wrinkled structure is formed.

Finally, the polymer is removed from the composite fiber, leaving a porous fiber composed of graphene alone. Specifically, the composite fiber is annealed at 300 to 1000° C. to volatilize the polymer or is treated with an acidic solution to remove the polymer.

The present invention will be explained in detail with reference to the following examples and accompanying drawings. However, these examples are provided to assist in further understanding of the invention and are not to be construed as limiting the scope of the invention.

Example 1: Preparation of Solution of Graphene (RCCG) Chemically Converted by Reduction In accordance with the method illustrated in FIG. 1, RCCG was dispersed in dimethylformamide (DMF) in the presence of an appropriate amount of triethylamine to obtain a stable graphene dispersion. Several grams of RCCG was obtained by reducing an aqueous dispersion of CCG with excess hydrazine at 95° C. over 2 h in accordance with previously reported methods (Li, D., Muller, M. B., Gilje, S., Kaner, R. B. & Wallace, G. G. Processable aqueous dispersions of graphene nanosheets. *Nature Nanotech.* 3, 101 (2008)). As a result of the reduction reaction, the graphene aggregated in the aqueous solution. The graphene aggregates were acidified with dilute sulfuric acid under vigorous stirring to a pH of 2 or less, and transferred to a sintered funnel. The aggregates were washed with a large amount of Milli-Q water on the funnel until the pH reached about 7. The filtered material was dried under vacuum at 70° C. for 48 h to obtain RCCG as a solid. The dried RCCG powder was dissolved in DMF to prepare a 0.47-0.5 mg/mL RCCG/DMF solution. The length of the graphene flakes was about 400 nm, as measured using a Zetasizer. The particle size and zeta potential remained stable for several months. The dispersion was filtered under vacuum to obtain a paper having a resistance of 30-40 Ω/sq.

Example 2: Production of Graphene Fiber

The solvent (DMF) of the graphene flake dispersion was exchanged with distilled water by centrifugation. The G/F aqueous solution was mixed with sodium dodecyl benzene sulfonate (SDBS) by ultrasonication.

The graphene dispersion was slowly injected into a coagulation bath containing PVA (molecular weight=89,000–124,000, degree of hydrolysis=~99%) through a syringe (26 gauge) and wet spun to continuously produce a uniform graphene/PVA fiber.

The graphene/PVA was annealed at 600° C. to remove the PVA, leaving behind a porous fiber composed of graphene alone. The diameter of the graphene fiber was 28 μm.

Experimental Example: Characterization of the Graphene Fiber

The graphene fiber was sufficiently flexible and thus could be wound on a glass tube having a small diameter of 6.5 mm without mechanical damage, unlike graphene papers tending to be brittle (FIG. 1B). Complete knots of the graphene fiber were difficult to form, but the formation of sufficiently strong, flexible, small diameter knots of the graphene fiber was possible (FIG. 1C). Difficulty in the formation of complete knots was due to the small length of the graphene flakes and the frictional force of the rough surface of the graphene fiber composed of the graphene flakes (FIG. 2B). Several strands of the graphene fiber can also be woven into a fabric.

FIG. 2 shows SEM images of the surface and cross-sectional morphologies of the graphene fiber obtained by removing the PVA from the graphene/PVA composite fiber. After annealing at 600° C. for 1 h or treatment with 37% hydrochloric acid for 24 h, the graphene fiber had a rough surface because of the wrinkled graphene flakes. (FIG. 2B) The wrinkled graphene flakes were aligned along the axis of the fiber (FIG. 2C) and were formed into highly porous petals (FIG. 2D).

The cross section of the graphene fiber can be specifically seen in FIG. 3, too. This image demonstrates the formation of graphene flakes without serious restacking.

FIG. 4 shows cyclic voltammograms of the graphene fiber at different scan rates (solution: 1 M $H_2SO_4$, reference electrode: Ag/AgCl). The electrical conductivity and electrochemical capacitance of the graphene fiber were 10-100 S/cm and 100-200 F/g, respectively. Accordingly, the graphene fiber is expected to find application in supercapacitors.

INDUSTRIAL APPLICABILITY

As is apparent from the foregoing, the graphene fiber of the present invention has outstanding mechanical and electrochemical properties and high electrical conductivity. The graphene fiber of the present invention is highly porous due to wrinkled structure thereof. Therefore, the graphene fiber of the present invention can be used as an electrode for a supercapacitor, a fuel cell, or a battery as an energy storage medium. The graphene fiber of the present invention can also be used to develop a hydrogen storage medium. In addition, the graphene fiber of the present invention can be formed into knot and spring structures due to flexibility thereof and can also be woven into a fabric. The porous graphene fiber of the present invention can be mass-produced in a simple and economical manner and its length can be extended to tens of meters in a continuous process.

The invention claimed is:

1. A method for producing a graphene fiber, comprising
   a) dispersing graphene and a surfactant in a solvent to prepare a dispersion,
   b) incorporating the dispersion into a polymer solution, wet spinning the resulting solution, followed by drying to produce a composite fiber, and
   c) annealing the composite fiber or treating the composite fiber with a strong acid to remove the polymer.

2. The method according to claim 1, wherein the graphene is chemically reduced graphene or graphene oxide.

3. The method according to claim 2, wherein the chemically reduced graphene is prepared by reducing an aqueous dispersion of graphene with hydrazine at 90 to 100° C. for 1 to 24 hours.

4. The method according to claim 1, wherein the annealing is performed at a temperature of 300 to 1000° C.

5. The method according to claim 1, wherein the strong acid is selected from hydrochloric acid, sulfuric acid, a piranha solution consisting of a mixture of sulfuric acid and hydrogen peroxide, a mixture of sulfuric acid and oleum, and mixtures thereof.

6. The method according to claim 1, wherein the graphene is 100 to 1000 nm in length.

7. The method according to claim 1, wherein the surfactant is selected from sodium dodecyl benzene sulfonate (SDBS), sodium dodecyl sulfonate (SDS), Triton X-100, and cetyltrimethylammonium bromide (CTAB).

8. The method according to claim 1, wherein the polymer is selected from polyvinyl alcohol (PVA) and poly(methyl methacrylate) (PMMA).

9. The method according to claim 1, wherein the contents of the graphene and the polymer in the graphene composite fiber are from 20 to 90% by weight and from 10 to 80% by weight, respectively.

* * * * *